April 28, 1964
I. JEPSON
3,130,881
TEA KETTLE WITH CLOSURE LID, HANDLE, AND POURING SPOUT
Filed March 16, 1961
2 Sheets-Sheet 1
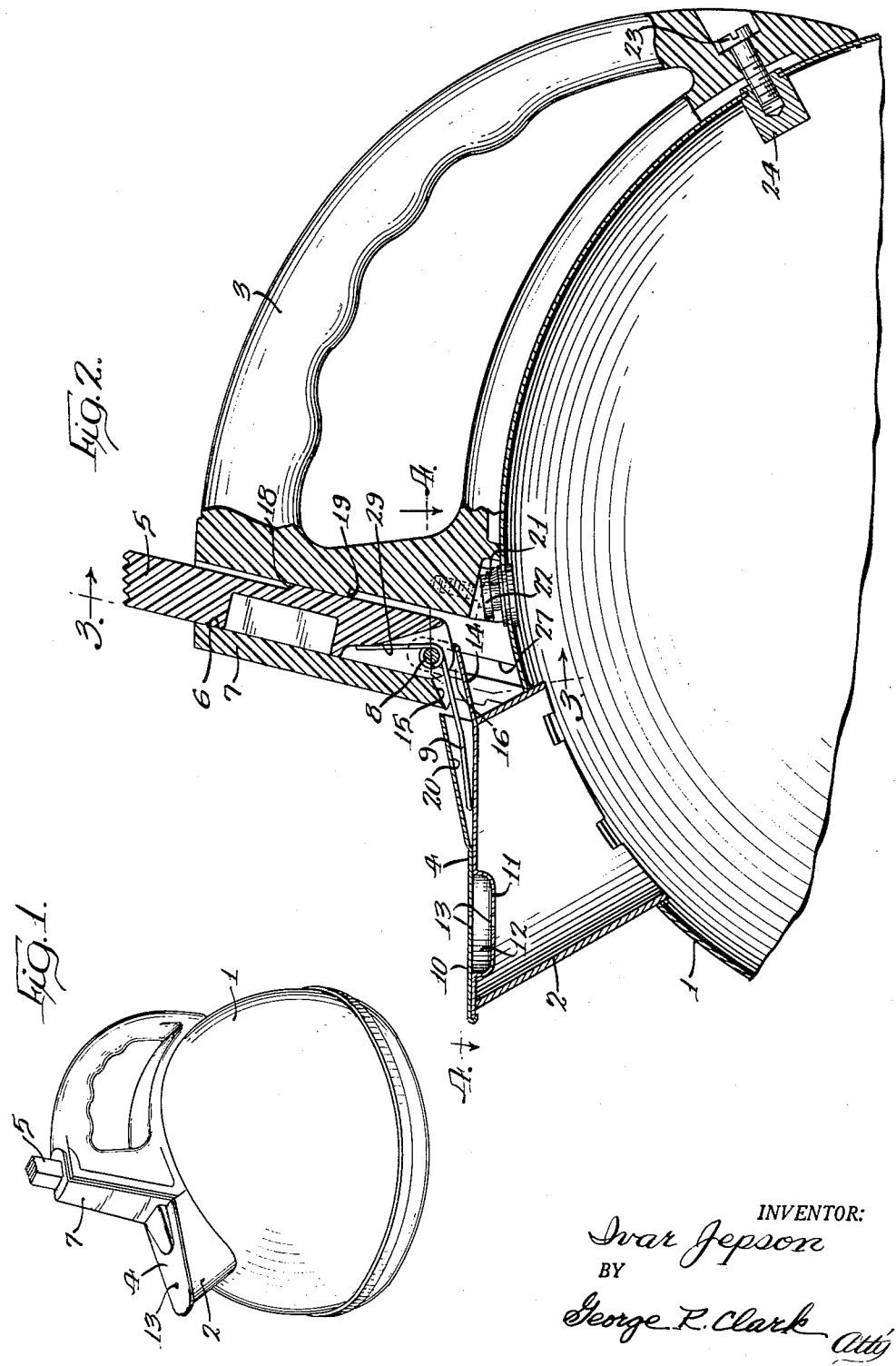
INVENTOR:
Ivar Jepson
BY
George R. Clark, Atty

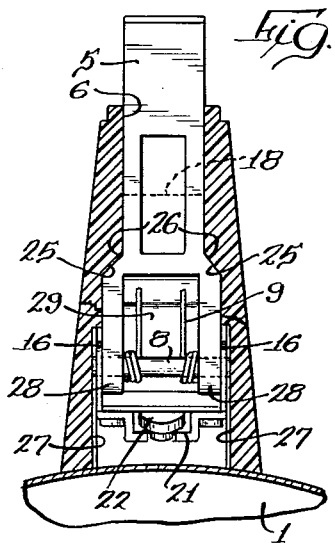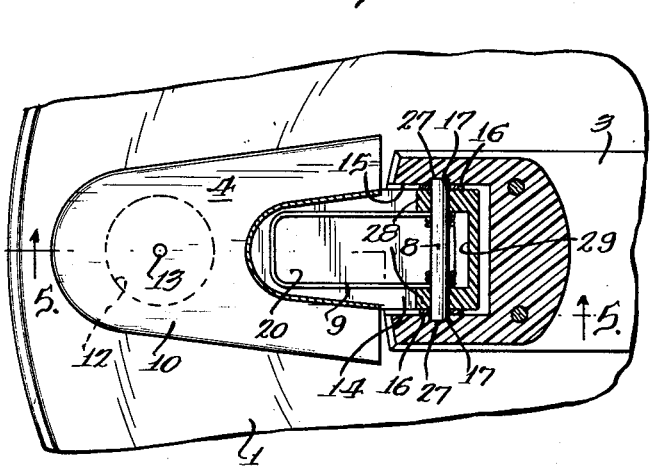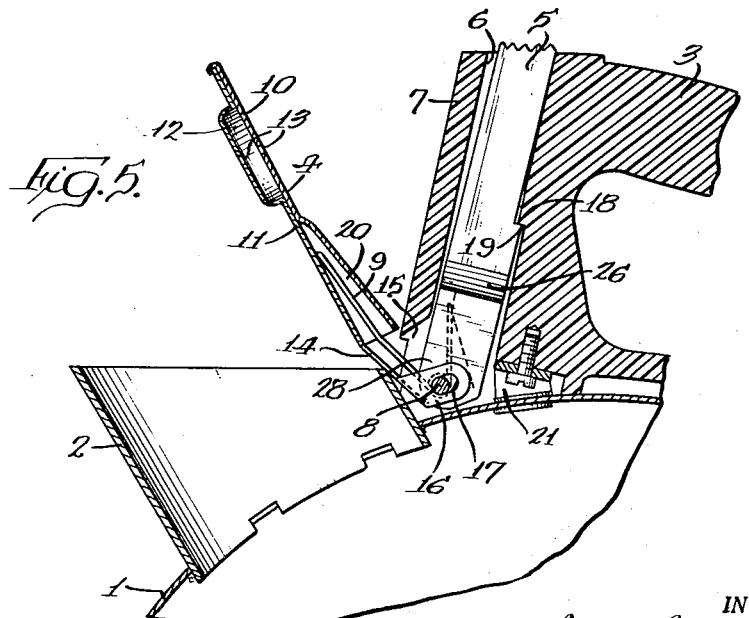

United States Patent Office 3,130,881
Patented Apr. 28, 1964

3,130,881
TEA KETTLE WITH CLOSURE LID, HANDLE, AND POURING SPOUT
Ivar Jepson, Oak Park, Ill., assignor to Sunbeam Corporation, Chicago, Ill., a corporation of Illinois
Filed Mar. 16, 1961, Ser. No. 96,160
2 Claims. (Cl. 222—470)

This invention relates to an improved closure means for heating devices having closed vessels, and more particularly, to an improved closure means for the pouring spouts of heating devices such as tea kettles and the like.

Although the invention is not restricted in its utility to tea kettles, it will be described in connection with the pouring spout of a tea kettle for purposes of illustrating one form of the invention. In tea kettles it is well known to incorporate a steam operated whistle in the cover for the spout. Successful operation of the whistle depends upon good sealed closure of the spout by the cover. Therefore, it would be desirable to provide an improved closure means for the pouring spouts of heating devices such as tea kettles and the like.

Some of the shortcomings of prior art pouring spout covers is that they and their operating means have not always been effective to seal the spout closed. This has been due in part to the fact that the covers have had pivot points which are relatively fixed with respect to the spout. This meant that it was necessary to initially align the cover and spout perfectly. Otherwise, the cover would not be properly seated on the spout. Therefore, it would be desirable to provide a cover for a pouring spout which is self-adjusting with respect to the spout. A further disadvantage of prior art pouring spout covers is that although they have been biased to closed position by springs or the like, the bias has not been properly transmitted to the cover to distribute the bias on the cover so as to seal all the edges of the spout. Accordingly, it would be desirable to provide bias means for spout covers wherein the bias is distributed throughout the cover.

It is one object of the invention to provide improved closure means for heating devices having closed vessels.

It is a further object of the invention to provide an improved closure means for the spouts of heating vessels such as tea kettles and the like.

It is a further object of the invention to provide a self-adjusting closure or cover for the pouring spouts of closed vessels.

It is a further object of the invention to provide a distributed closing bias on the covers of pouring spouts.

It is a still further object of the invention to overcome the above set forth disadvantages of the prior art by providing a cover and cover operating means which is low-cost, uncomplicated, easy to install and operate, and has a minimum number of parts and no likelihood of jamming or sticking.

Briefly, in the preferred form of the invention as applied to the pouring spouts of tea kettles, the closure means for the spout comprises essentially a cover having a spring biased pivotal connection with a thumb operated plunger. The plunger is guided in a passageway formed in the handle of the tea kettle. The cover and plunger and their spring biased pivotal connection have no fixed connection with any stationary part of the tea kettle, and the cover is arranged to slidably and pivotally ride or rock on a rear portion of the rim of the pouring spout. Therefore, the cover can adjustably seat itself on the pouring spout. Furthermore, the spring biased pivotal connection is provided with lost motion means so that in effect the cover can also move bodily slightly with respect to the plunger aside from the movement afforded therebetween by the pure pivotal action provided between these two parts. Additionally, the closing bias of the spring biased pivotal connection is transmitted to the cover so that the bias is distributed to all parts of the cover. In this manner, the cover is adjustably sealingly seated on the pouring spout.

The features of the invention which are believed to be novel are set forth with particularity in the appended claims. The invention itself, however, both as to its organization and operation, together with further objects and advantages thereof, may best be understood by reference to the following description taken in connection with the accompanying drawings.

In the drawings,

FIG. 1 is a perspective view of one form of the invention;

FIG. 2 is a broken away enlarged side view of the invention;

FIG. 3 is a sectional view taken along the line 3—3 of FIG. 2;

FIG. 4 is a sectional view taken along the line 4—4 of FIG. 2; and

FIG. 5 is a sectional view taken along the line 5—5 of FIG. 4 with the cover in open position.

The device illustrated in the drawings comprises a tea kettle. The device may be heated by built-in electrical heating means. However, the invention is also useful in heating devices which have vessels which are heated by placing the same on the conventional cooking surfaces of gas or electric ranges or the like. The following description will relate only to those parts of the heating device which are believed to be necessary for a full understanding of the invention.

The tea kettle comprises a closed vessel or container 1 having a pouring spout 2 and a thermally insulated material handle 3. Although vessel 1 is illustrated as having a semispherical shape, it could have other configurations. The spout 2 and handle 3 are connected to the top or upper portion of vessel 1 with spout 2 being disposed in front of handle 3.

The spout 2 is provided with a closure or cover member or plate 4 which is operated to open position by a thumb operated plunger 5. Plunger 5 is a generally elongated and vertically disposed member which is guided within a generally elongated and vertically disposed passageway 6 formed in the forward post portion 7 of handle 3. The cover member 4 is pivotally connected to plunger 5 at pivot pin 8. Pivot pin 8 is surrounded by a spring 9 which has its opposite ends bearing against cover member 4 and plunger 5 so as to bias these two members away from each other.

The cover member 4 comprises a pair of superposed sheet metal members 10 and 11 which are spaced from each other adjacent the forward portion of cover member 4 to define a steam whistle resonating chamber 12. The chamber 12 has a pair of aligned apertures 13 formed therein so that steam passing through chamber 12 by way of aligned apertures 13 will cause chamber 12 to resonate or whistle in a manner understood by those skilled in the art.

Cover member 4 is pivotally connected to plunger 5 at pivot pin 8 by virtue of a rearwardly extending integral extension 14 formed on member 11. The forward wall of post 7 has an opening 15 formed therein so that part 14 can extend from cover member 4 into passageway 6. The innermost end of extension 14 has a pair of ears 16 or tabs formed thereon. Ears 16 are bent up from the plane of part 14 and they have aligned apertures 17 formed therein which are adapted to receive opposite ends of pivot pin 8. The apertures 17 are slightly larger than the pin 8 (see FIG. 5) so as to provide lost motion at the spring biased pivotal connection between the cover member 4 and the plunger 5.

The opening in spout 2 is defined by the upper rim of the spout. The cover member 4, and in particular the rearward extension 14, is adapted to slidably and pivotally ride or rock on the rear portion of the rim of the spout. Accordingly, when plunger 5 is depressed by thumb pressure, cover member will be caused to move to open position about the rear rim of spout 2. The plunger 5 and guideway 6 have interengageable stepped surfaces 18 and 19 formed thereon. When plunger 5 is depressed far enough for stepped surface 18 to catch on stepped surface 19, the cover member 4 will be retained set in opened position as shown in FIG. 5. To close cover member 4 it is only necessary to push the upper end of plunger 5 forwardly to unhook shoulder 18 from shoulder 19. Disengagement of shoulders 18 and 19 causes spring 9 to automatically urge plunger 5 upwardly and cover member 4 to closed position. Inasmuch as neither the cover member 4 or plunger 5 or their spring biased pivotal connection 8 have any fixed connection with respect to stationary parts of the tea kettle, the cover member 4 is free to adjustably seat itself on the upper rim of spout 2 after disengagement of the shoulders 18 and 19. Adjustable seating movement of cover member 4 is additionally provided by the lost motion incorporated into the spring biased pivotal connection between cover 4 and plunger 5. That is to say, since the openings 17 in ears 16 are slightly larger than pivot pin 8, the cover 4 can move or shift bodily slightly relative to pivot pin 8.

The self-adjustably seated cover 4 is sealed closed on spout 2 by the closing bias of the spring 9. The left-hand end of spring 9 bears down on a central portion of cover 4 and in this manner the closing bias of spring 9 is distributed to all portions of cover 4 and the entire rim edge of spout 2. The central portion of cover 4 has its two plates 10 and 11 spaced from each other in a rearward direction to define a spring receiving channel or passageway 20 therein. The left-hand end of spring 9 extends from pivot pin 8 through the opening 15 into the channel 20 to loosely bear down on the central portion of cover plate 4.

The cover member 4 and thumb operated plunger 5 and the spring biased pivotal connection therebetween comprises a manually operated closure means sub-assembly for spout 2 which has a minimum number of parts whereby it is low-cost, and easy to assemble and operate with no likelihood of jamming or sticking. This sub-assembly essentially comprises five parts consisting of the two plates 10 and 11 which make up the cover member 4, the plunger 5, and the spring biased pivotal connection comprising pivot pin 8 and spring 9. In assembling this sub-assembly into handle 3, all that is necessary is to insert plunger 5 into passageway 6 starting at the bottom end of the passageway. The cover 4 is then pivoted in an upward direction and handle 3 is positioned over vessel 1 so that cover 4 overlies spout 2. The forwardmost portion 7 of handle 3 is quickly connected to the top of vessel 1 by virtue of a notched bracket 21 which is slipped about a headed stud 22, stud 22 being fixed to vessel 1 and bracket 21 being fixed to post 7. Thereafter, the assembly is completed by fastening the rear portion of handle 3 to vessel 1 by means such as stud 23 and stud receiving member 24, the latter being fixed to vessel 1.

The upper portion of handle 3 which extends integrally in a rearward direction from the upper portion of post 7 provides a convenient hand grip for holding the tea kettle. The upper end of plunger 5 protrudes through the upper portion of post 7 so that plunger 5 can be conveniently operated by the thumb of the tea kettle user while he is holding the tea kettle by the hand grip portion of handle 3. Upper spring biased movement of plunger 5 is limited by cooperating tapered surfaces 25 and 26 formed respectively in passageway 6 and on plunger 5. Also, besides the guiding function of passageway 6 for plunger 5, plunger 5 is additionally guided in its up and down movement by a pair of grooves 27 formed in passageway 6 which are adapted to receive the outer ends of pin 8 therein.

The plunger 5 has transverse dimensions which are slightly less than the transverse dimensions of passageway 6. This is to permit plunger 5 to move slightly in a rearward direction when it is depressed for catching of shoulder 18 on shoulder 19. When these two shoulders are opposite to each other, plunger 5 will be moved rearwardly slightly by the bias of the upper end of spring 9. Since the guideway 6 is slightly larger than the plunger 5, when it is desired to reclose the cover member 4, the plunger 5 can be pushed forwardly with mild thumb pressure to disengage the shoulders 18 and 19.

The pin 8 is connected to the lower end of plunger 5 by bifurcating the lower end of plunger 5 as indicated by the lower opposite spaced side portions 28 thereof. The pin 8 passes through aligned apertures in the portions 28. Although the lost motion at the spring biased pivotal connection is provided by making the openings 17 in ears 16 larger than pin 8 it will be obvious to those skilled in the art that this lost motion could be provided by making the holes in the portion 28 for the pin 8 larger than the pin 8. The spring 9 after fabrication is generally U-shaped and its central portion is coiled about the portion of pin 8 disposed between the lower side portions 28 of plunger 5. The upper free ends of spring 9 bear against an integral portion 29 of plunger 5 which bridges the side portions 28. The lower left-hand closed end of spring 9 enters the channel 20 which is formed in cover member 4 extending from the rear thereof to its central portion.

Aside from the whistle chamber 12 and the spring channel 20, the two plates 10 and 11 of cover member 4 are in contact with each other. These two plates may be fastened together by an expedient such as turning the outer peripheral rim of upper plate 10 over the outer peripheral rim of lower plate 11.

While there has been shown and described a particular embodiment of the invention, it will be obvious to those skilled in the art that changes and modifications may be made without departing from the invention, and that it is intended by the appended claims to cover all such changes and modifications as fall within the true spirit and scope of the invention.

What is claimed as new and desired to be secured by Letters Patent of the United States is:

1. A tea kettle comprising a vessel, a handle, a pouring spout, and a closure lid on said spout, said handle having an upright post, said post being positioned behind said spout, a vertically disposed guide passageway formed in said post, a vertically movable member disposed in said passageway, a pivotal connection between said closure lid and the lower end of said movable member, a spring at said pivotal connection, said spring biasing said closure lid to closed position and said movable member upwardly, and the upper end of said movable member extending through the upper end of said post for access to downward movement by thumb pressure whereby said closure lid is pivoted to open position.

2. In a tea kettle as in claim 1, wherein there is looseness at said pivotal connection to provide lost motion movement between said closure lid and movable member, and one end of said spring extending from said pivotal connection to the central portion of said closure lid to distribute its bias thereto.

References Cited in the file of this patent

UNITED STATES PATENTS

| 1,837,198 | Boylan | Dec. 22, 1931 |
| 2,110,058 | Baron | Mar. 1, 1938 |
| 2,501,142 | Reichart | Mar. 21, 1950 |
| 2,507,934 | Reichart | May 16, 1950 |

FOREIGN PATENTS

| 454,525 | Italy | Jan. 24, 1950 |